United States Patent
Eapen et al.

(10) Patent No.: US 12,316,585 B1
(45) Date of Patent: May 27, 2025

(54) WORKFLOW INSIGHTS AND DATA ASSISTANT

(71) Applicant: MORGAN STANLEY SERVICES GROUP INC., New York, NY (US)

(72) Inventors: Sujit Eapen, Plainsboro, NJ (US); Julius H. Kim, Manhasset, NY (US); Parthasarathi Jayapathi, Cumming, GA (US)

(73) Assignee: MORGAN STANLEY SERVICES GROUP INC., New York, NY (US)

( * ) Notice: Subject to any disclaimer, the term of this patent is extended or adjusted under 35 U.S.C. 154(b) by 0 days.

(21) Appl. No.: 18/932,510

(22) Filed: Oct. 30, 2024

(51) Int. Cl.
*H04L 51/02* (2022.01)
*G06F 16/34* (2025.01)
*G06Q 10/0633* (2023.01)
*G06Q 10/0635* (2023.01)

(52) U.S. Cl.
CPC ............ *H04L 51/02* (2013.01); *G06F 16/345* (2019.01); *G06Q 10/0633* (2013.01); *G06Q 10/0635* (2013.01)

(58) Field of Classification Search
CPC ... H04L 51/02; G06F 16/345; G06Q 10/0633; G06Q 10/0635
See application file for complete search history.

(56) References Cited

U.S. PATENT DOCUMENTS

| | | |
|---|---|---|
| 11,625,152 B1 | 4/2023 | Johnston et al. |
| 2017/0301017 A1* | 10/2017 | Magdelinic ............ G06Q 40/04 |
| 2018/0321830 A1 | 11/2018 | Calhoun et al. |
| 2021/0157861 A1* | 5/2021 | Katzman ................. G06F 16/93 |
| 2021/0374671 A1* | 12/2021 | Li ............................ G10L 15/26 |
| 2021/0409352 A1* | 12/2021 | Arunachalam ....... H04L 63/105 |
| 2022/0004954 A1* | 1/2022 | Rafferty .................. G06F 40/35 |
| 2022/0308918 A1 | 9/2022 | Pandey et al. |
| 2022/0382580 A1 | 12/2022 | Frank et al. |
| 2023/0080417 A1 | 3/2023 | Kwatra et al. |
| 2023/0083159 A1 | 3/2023 | Padmanabhan et al. |
| 2023/0206181 A1 | 6/2023 | Stone |
| 2024/0232765 A1* | 7/2024 | Austraat ................. G06F 40/30 |
| 2024/0257956 A1* | 8/2024 | da Silva Santos ..... G16H 10/60 |
| 2024/0386348 A1* | 11/2024 | Reichl .............. G06Q 10/06316 |

* cited by examiner

*Primary Examiner* — Soe Hlaing
(74) *Attorney, Agent, or Firm* — Weitzman Law Offices, LLC

(57) ABSTRACT

A system for improving approval processes to at least one software service, including a workflow platform with multiple business processes and user roles, an AI-enabled chatbot integrated with the workflow platform, the chatbot utilizing GAI techniques to provide information on policies, procedures, and workflow transactions, a data integration module retrieving and aggregating data from multiple sources, and a user interface displaying summarized information and recommendations generated by the AI-enabled chatbot. The AI-enabled chatbot automatically approving workflows based on thresholds.

18 Claims, 9 Drawing Sheets

WINDA Sequence

```
{
  "workflowConfig": {
    "appId": "PL",
    "category": "WMADV",
    "subCategory": "AT Fee Waiver",
    "config": {
      "category": "WMADV",
      "subCategory": "AT Fee Waiver",
      "workflowType": "Advisory Fee Waiver",
      "workflowPriority": "High",
      "initialAudit": "Submitted",
      "initialStatus": "Pending Approval",
      "initialStepName": "BSM/CBSO",
      "timeScheduleName": "MS24X5TimeSchedule",
      "folderDetails": {
        "attachedFolderName": "BWF FIELD DOCUMENTS",
        "transactionType": "Fee Waiver"
      },
      "actions": [
        {
          "stepId": "1",
          "config": {
            "rolesForTeam": "BWFAFW2",
            "stepName": "BSM/CBSO",
            "taskType": "HUMAN",
            "urlTemplate": "/bpmui/processlite/consumerui/",
            "timerConfig": {
              "autoCompletion": "129600",
              "dueIn": 72
            },
            "uiAction": [
              {
                "action": "APPROVE",
                "stepId": "4",
                "status": "Approved",
                "stepName": "RBSO/RMA",
                "auditMessage": "Approved"
              },
              {
                "action": "REJECT",
                "stepId": "5",
                "status": "Rejected",
                "stepName": " ",
                "auditMessage": "Rejected"
              },
              {
```

*Fig. 6A*

```
      "action": "CANCEL",
      "stepId": "5",
      "status": "Cancelled",
      "stepName": " ",
      "auditMessage": "Cancelled"
    },
    {
      "action": "AUTOREJECT",
      "stepId": "5",
      "status": "Expired",
      "stepName": " ",
      "auditMessage": "Expired"
    }
  ],
  "buttonVisibilityType": "roleBased"
},
"isCustomExpiration": false
},
{
  "stepId": "4",
  "config": {
    "stepName": "NOTIFYWORKFLOWCOMPLETION",
    "taskType": "SYSTEM",
    "uiAction": [
      {
        "action": "Success",
        "stepId": "5",
        "stepName": " ",
        "auditMessage": "Fee waiver update applied successfully"
      },
      {
        "action": "Cancel",
        "stepId": "5",
        "status": "Cancelled",
        "stepName": " ",
        "auditMessage": "Fee waiver not applied due to termination or update to the account and no longer qualifies for fee waiver"
      }
    ],
```

Fig. 6B

```
            "buttonVisibilityType": "default"
          },
          "isCustomExpiration": false
        },
        {
          "stepId": "5",
          "config": {
            "stepName": "ARCHIVEPROCESS",
            "taskType": "SYSTEM",
            "urlTemplate": "/bpmui/processlite/consumerui/",
            "buttonVisibilityType": "default"
          },
          "isCustomExpiration": false
        }
      ]
    },
    "initConfig": {
      "initType": "branchWithCustomInitiation",
      "initiationCheck": true,
      "config": [
        {
          "stepId": "1",
          "rolesForTeam": "BWFBRMGR"
        }
      ]
    }
  },
  "emailConfigList": [
    {
      "workflowType": "Advisory Fee Waiver",
      "workflowStepId": "1",
      "workflowStatus": "Pending Approval",
      "templateName": "CGT001",
      "roles": "BWFAFW2",
      "user": "",
      "category": "WMADV",
      "subCategory": "AT Fee Waiver"
    }
  ]
}
```

*Fig. 6C*

WORKFLOW INSIGHTS AND DATA ASSISTANT

FIELD

This disclosure relates to computer systems and methods and, more particularly, to systems and methods for workflow management.

BACKGROUND

Workflow programs, which include several projects, have become a necessary form of accomplishing small, medium and large implementations that enable different groups, possibly geographically dispersed, to perform work discretely while having functional managers, program and project managers tie the inter-connectivity relationships between different projects, programs and mega programs throughout the delivery lifecycle. These implementations can be related to industry specialization such as information technology (IT) systems, software and hardware developments, outsourcing management, building and constructions, shipyard building, education and health systems, oil, gas and chemical processes and many other industry segments that require management of methodology and processes.

Effectively handling the scope, effort, budget, asset and people resource-scheduling, as well as risks, collaboration, day-to-day activities, status and progress activities across every level of individuals, which may include technical, functional administration, management and executives is challenging in many aspects.

Currently, it is difficult to cohesively deal with supporting functions such as approvals, meeting decision tracking, independently defined and stored business considerations that can be dynamically associated to their localized activities, action items and attachments with workflows that can be associated with each source of activity, and conditions and threshold capability to trigger other actions.

SUMMARY

Workflows represent business processes comprising a sequence of tasks that often include human approvals. Workflow platforms serve numerous business users across various roles and departments, for example, encompassing in excess of 100 workflows. Users typically spend substantial time referring to documentation, policies, and procedures before approvals. The growing volume of workflows and user base necessitates optimized information delivery to improve efficiency and reduce time spent on approvals.

In order to address the limitations of previous systems in this field, we have determined that there are advantages to automating configuration-driven accelerated workflow builder innovation, which is agnostic to the workflow products so that it can be applied on top of multiple workflow products. Moreover, implementations incorporating the dynamic user interface (UI) builder and preview capabilities described herein can be applied to many form-based web applications for any domains/industries.

Moreover, some implementations can include an "Ask Me Anything" chatbot built on generative artificial intelligence (GAI), which is integrated with the workflow platform to offer a 360-degree view, answer policy and procedure queries, summarize transactions, and address underlying issues within the platform.

One aspect of this disclosure involves a system for improving approval processes in a workflow platform for at least one software service. The system includes data storage containing a plurality of software components to provide the at least one software service, one or more processors, and non-transitory memory storing instructions that, when executed by the one or more processors, cause the one or more processors to: integrate an AI-enabled chatbot with a workflow platform, use the integrated AI-enabled chatbot to provide real-time responses to user queries about policies, procedures, and workflow transactions, aggregate data from the real-time responses to provide contextual information to the system, summarize key artifacts and transactions in the aggregated data using an AI completion Application Programming Interface (API) to identify next steps, provide insights based on the summarization, show appropriate actions subject to users entitlements (including but not limited to Approve and Reject task/workflow); and feedback user input to improve relevance of the AI-enabled chatbot's responses.

Another aspect of this disclosure involves a computer-implemented method for improving approval processes in a workflow platform to at least one software service. The method involves querying non-transitory data storage to identify user quires associated with a particular software component, integrating an AI-enabled chatbot with a workflow platform, using the integrated AI-enabled chatbot to provide real-time responses to user queries about policies, procedures, and workflow transactions, aggregating data from the real-time responses to provide contextual information to the system, summarizing artifacts and transactions in the aggregated data using an AI completion API to identify next steps, providing insights for a workflow approval process based on the summarizing, and utilizing user feedback to improve relevance of the AI-enabled chatbot's responses.

Advantageously, some implementations of the teachings herein can integrate multiple data sources, including historical data and audit notes, support broad business workflows, such as asset movement, new account onboarding, enhanced due diligence, risk, legal, account maintenance, trading, legal advisory, and provide dynamic chatbot onboarding for each workflow through configuration during onboarding.

BRIEF DESCRIPTION OF THE DRAWINGS

Other aspects, features and advantages will become more fully apparent from the following detailed description, the appended claims, and the accompanying drawings (provided solely for purposes of illustration without restricting the scope of any claim herein or implementation), of which:

FIGS. 6A-6C collectively illustrate, in a simplified form, one example of sample JSON code usable for workflow onboarding to implement various features and processes described herein.

DETAILED DESCRIPTION

Figure 1:
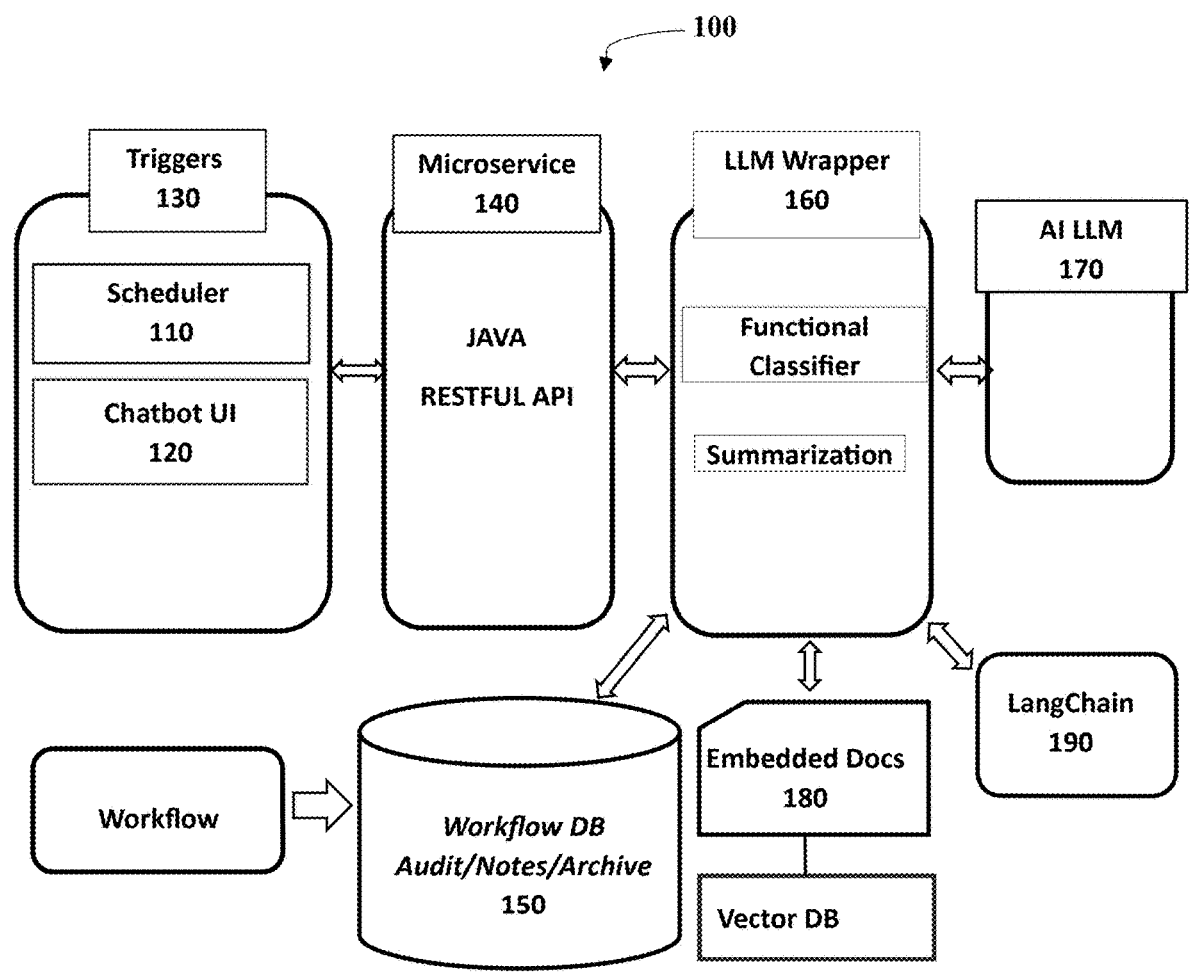
FIG. 1 illustrates, in a simplified form, one example of the logical architectures of an AI-based offline workflow recommendation system for workflow identification and optimization according to the teachings herein.

The methods described herein may apply to a wide variety of contexts when numerous computing devices or modules are in communication with one another to provide services to an end user.

A Wealth Management Workflow Platform (WMWP), for example, may be used to support more than 25,000 users, in a large financial services entity, for business-critical process flows. These process flows support various business areas such as an Asset Movement, Enhanced Due Diligence (EDD), peer-to-peer (P2P) users, and more. For example, there may be over 120 workflows, 5 million document uploads (yearly), and interactions with over 20 systems in such a representative company's eco-system. In such an organization, more than 50% of an average employee's day may be spent within a workflow researching and a navigation within various systems. Moreover, user roles can vary widely within the organization ranging from financial advisors, branch managers, Service Review Unit (SRU) entity, operations, technology support, and many others.

There are problems that arise when these techniques are implemented. By way of example, if a user needs to investigate transactional issues, the user must navigate between different systems to find that information before initiating a workflow. Similarly, when an approver needs to approve a complex workflow, the user needs to carefully find all the details and analyze them before taking an action to proceed with the workflow or reject it. If some workflow runs into issues and/or delays, a production support person must navigate between systems to determine whether any open incident can be linked or they may end up duplicating incidents that are already an issue and are impacting workflows.

In a growing business environment, increased volumes and user-base systems has increased demand to optimize information delivery and workflow process.

As a further more real-world example, there are over 25,000 users of a financial services Workflow Platform (roughly 30% of a company's workforce), who are directly involved in various business critical workflows. The efficiency gains within a user's day have a direct impact on the quality of service that can be provided to company's clients. For example, financial advisors, branch managers, SRU, operations, technology support, and many others may spend a lot of time looking at business rules and procedures when fulfilling client requests. The financial advisors, branch managers, SRU entity, operations, technology support and many others may need a better ability to answer issues and access lifecycle state of their workflows. The workflows tend to be complex, having many moving parts and are hard to navigate through all details in a short amount of time. We estimate that more than 50% of support personnel's (SPs) day is spent on researching client requests before taking actions and/or approvals. The technical supports are needed to reduce the time for researching client requests before taking actions and/or approvals. For example, the Workflow Platform needs to navigate among systems to find open incidents. As a result, often multiple and/or duplicate incidents are opened for the same problem.

As a solution, one aspect of an example variant of our system is a Workflow Insights Data Assistant (WINDA). WINDA is an advanced generative AI-enabled chatbot designed to enhance workflow platforms. WINDA includes an interactive "Ask Me Anything" chatbot providing a 360-degree view of the entire workflow platform, to facilitate quick retrieval of information, and offer real-time cognitive analysis. WINDA aims to optimize the workflow approval process, reduce human errors, and provide transparency on system issues impacting workflows. The AI powered chatbot of WINDA can provide tailored responses based on a user's role. Leveraging the OpenAI's API, this intelligent assistant can analyze transaction data, answer real-time user questions, provide a fraud detection through comprehensive risk scores, facilitate a linkage to other related account or user activities. The system may further aim to empower financial professionals with timely insights and improve their decision-making capabilities when navigating through complex money movement workflows. The implementation aims to use the AI models to systematically detect improvement opportunities (by analyzing historical workflow transactions) and proposing a new workflow definition that can be used for potential new business process flows and the inherent efficiency gains. By utilizing the details of previous workflows, the system can detect which workflow steps/stages took a considerably longer time for users to complete and analyze what actions (by inspecting the notes and audit details) that users took to move the workflow forward. The common resolution actions taken across the historical dataset can be used to highlight a pattern of activity that can be systematically encapsulated as a new workflow definition.

FIG. 1 illustrates, in simplified form, an overview of the architecture for an example system 100 implementing the teachings herein. The system 100 is made up of one or both of a Scheduler 110 and/or a Chatbot user interface (UI) 120, a trigger 130 coupled to the Scheduler 110 and/or the Chatbot UI 120. The Scheduler 110 and/or the Chatbot UI 120 is coupled to one or more Microservices 140 that is coupled to the LLM Wrapper 160 for an OpenAI implementation. The LLM Wrapper 160 is coupled to a source of embedded documents 180 as well as the LangChain 190. Finally, for operation, the Scheduler 110 and/or the Chatbot UI 120 are initiated by the trigger 130, as will be discussed in greater detail below.

The Scheduler (e.g., Java, Tivoli, .net or Cron) 110 may trigger the WINDA process on a regular basis, for example daily, for data collection, analysis, and recommendations. It can invoke Database Adapter/Data Access Objects (DAO) components to query a workflow datastore (workflow active task tables for inflight transactions, archive tables, audit, notes tables for historical workflows). For an example, a workflow task table may contain task level info for active workflows and details such as start/end dates, a potential owner role, a current step owner, a last updated time, a workflow type, task meta-data, a dept, a region, and so forth. An audit table may contain the actions taken and state transitions for each workflow around claim/unclaimed, document uploads, approval/reject, modify, a user, task level idle/active timings, and so forth. Workflow related rules externalized in a Business Rules Management System (BRMS) (for example, IBM Operational Decision Manager (ODM), Drools) can also be used to analyze workflow level optimizations. These rules may drive workflow behaviors and flows based on thresholds and/or attributes. The Scheduler 110 also serves as quality check for workflows by a sampling dataset systematically for data quality and data integrity. The threshold may be predefined by a user through the settings in the system 100.

The Chatbot UI 120 is the user interface through which a user can input queries. The Chatbot UI 120 may be alternatively used to trigger the WINDA process daily for data collection, analysis, and recommendations.

The microservice 140 may receive data from or save data to the workflow database 150. The microservice 140 is a component that may expose various REST based APIs to support CRUD operations, data analysis, and recommendation functions.

The workflow database 150 is a database that contains audits and notes (past & active history). Notes/comments in the workflow database 150 can be used to identify what actions were taken outside of the workflow process definition (get timings, actions, manual inferences, swivel chair details of the systems, and so forth). For example, an AI model can recognize patterns, and make decisions in determining the appropriate procedure to execute (such as OpenAI GPT 4.0) can evaluate the data inputs (composed of the original workflow elements, the workflow type, the notes/audit details of all related transactions, user/chatbot conversation interactions, and embeddings from other data sources).

The LLM Wrapper 160 is a wrapper for an OpenAI implementation 170. The LLM Wrapper 160 is made up of a functional classifier module and a summarization module. A functional classifier module can process from a function definition to a prompt input. The function classifier will have a list of APIs that are relevant for a given workflow, based on the context provided by the user, the system will determine which API(s) will be utilized for retrieving the relevant data from multiple data sources. The LLM Wrapper 160 also has a summarization module that can process. The system will follow the Retrieval Augmented Generation (RAG) framework to supply the relevant data points (from the historical audit, notes and workflow data based on user's data entitlements and knowledge base articles) to the AI model for summarizing the collected information (while utilizing prompts for refining the response format). from identifying a function, to data/embedding aggregation, to a prompt input. The LLM Wrapper 160 can also use the LangChain 190 in connection with the processing by the summarization module. The LLM Wrapper 160 can further interact with an OpenAI system 170.

The embedded documents 180 of the system 100 may include data such as (but not limited to) workflow type, workflow step/status, peer info, notes/comments and audit trail. The data inputs into the AI model can be stored and queried from a database and/or other data sources/systems, where the dependent datasets can be embedded into a vector database, which is a collection of data stored as mathematical representations. The system 100 can correlate and aggregate the relevant embeddings from the corpus and pass the result to the AI model.

Any LLM Orchestration framework (such as Lang Chain) 190 is an open-source framework for building applications based on large language models (LLMs) that interacts with the LLM wrapper 160. LangChain 190 is a library of abstractions for Python and JavaScript, representing common steps and concepts necessary to work with language models. For example, LangChang 190 can support simple memory systems that recall the most recent conversations, and complex memory structures that analyze historical messages to return the most relevant results.

The AI LLM 170 may be implemented in a local or remote/external system. A policy and procedure lookup/summarization can be done using the AI LLM 170. Workflow risk calculations can be done with the AI LLM 170. The AI LLM 170 leverages GAI to calculate an on-demand risk score and justify a risk analysis on a workflow. Because of the input of the risk score and analysis, a user may be aware of the potential risk, and the risk awareness can help reduce fraudulent activity.

Figure 2:
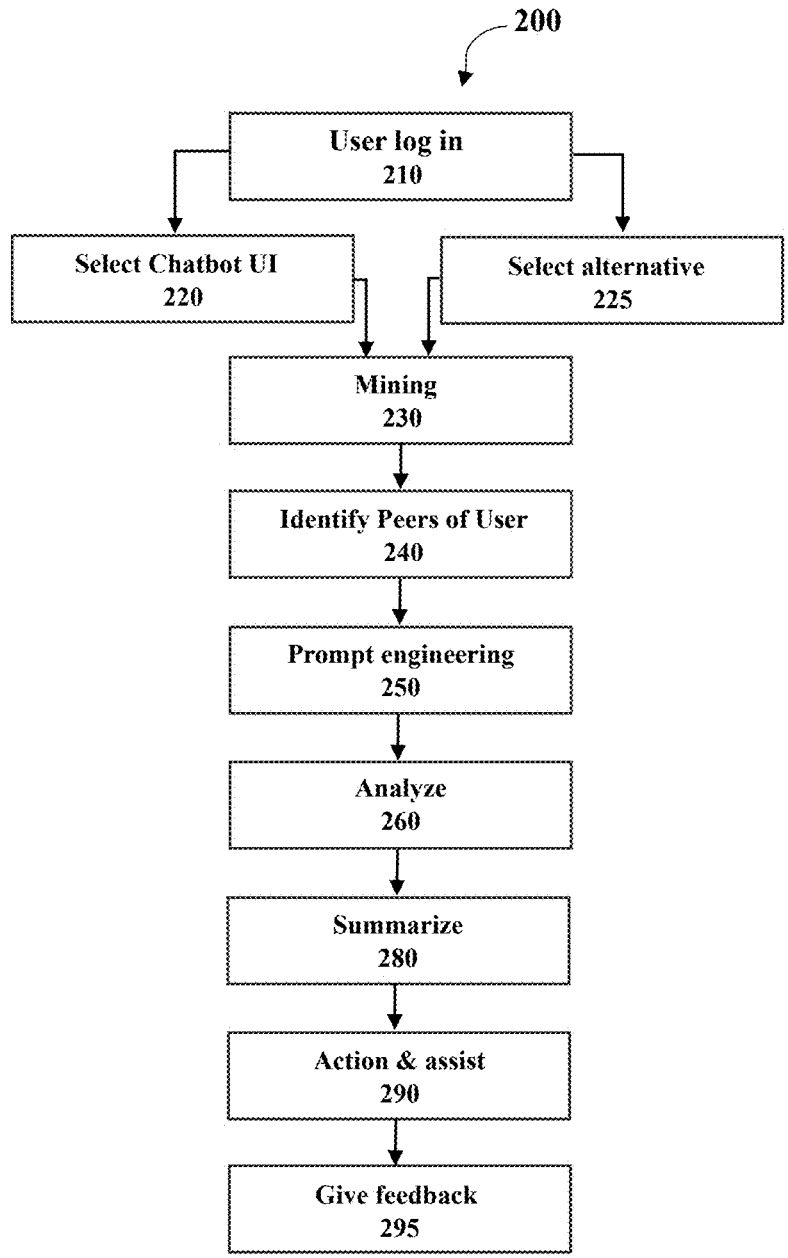
FIG. 2 illustrates, in a simplified form, one example of a workflow diagram of "Ask me Anything" as an online interactive support chat bot according to the teachings herein.

FIG. 2 illustrates in simplified form, an example flowchart 200 for one example implementation showing how the system 100 operates on workflow information, based upon the trigger 130 triggering the Scheduler 110. The system 100 incorporates "Ask me Anything" as an online interactive support chatbot according to the teachings herein. As shown, the variant of FIG. 2 includes two alternative selections for a chatbot UI. The process proceeds as follows. First, a user logs in (Step 210) to the Workflow Dashboard and claims a task for a specific workflow. Selecting one chatbot UI (Step 220), for a chatbot implemented according to the teachings herein, invokes (or triggers) a process where the system can preemptively suggest ways to move forward based on prior remediation steps taken by peers (that worked on similar data elements or challenges). Alternatively, a trigger or user selection (Step 225) may invoke another, alternative, chatbot UI, through which a user can, via that alternative chatbot UI, ask the chatbot pointed questions around remediation to move the workflow forward. After the selection, the system 100 performs mining (Step 230) of information to retrieve and reference relevant workflow related data points from previous transactions. For example, the mined information can include embeddings, which are an indexed data source that feeds into the AI model. The mined information can include entitlements details of the user, so a returned dataset can be screened or made subject to the user's entitlements details, and the user can only gain access to the returned portion of the dataset to which their entitlements apply. The mined information can also or alternatively include workflow details such as workflow type, workflow step/status, peer information, notes/comments and audit trail. Next, the system 100 identifies (Step 240) peers of the user based on the mined information. For example, the system 100 can identify peers of the user using a functional role and/or data entitlement. Also, or alternatively, the system 100 can identify peers of the user using department and cost center information. Next, prompt engineering (Step 250) uses the mined data and fetches the potential workflow details and patterns for the remediation. Through the prompt engineering, the system 100 can analyze (Step 260) what manual workaround/actions (not necessarily in the workflow) were performed in order to resolve and move the workflow step forward. The system 100 can also, optionally, include a summarization capability from the AI model using a completions API. The system 100 can then summarize (Step 280) the recommendations, for example, specifying what an action(s) was/were taken, how long a process took, what additional data elements were used to resolve the issue, and what additional stake holders were involved. Next, an "Action Recommendation and Assist" module (Step 290) provides details of the action and why it is needed (i.e., a reason, an identification of a system/API that needs to be used, credential details, etc.). Also, the "Action Recommendation and Assist" (Step 290) module can ask a user if the user wants to execute the action, for example, invoke systematic remediation (API, Database update, etc.) and log the activity into the workflow audit trail. Finally, the system 100 can receive feedback (Step 295) from the user, via the chatbot UI, to help train the AI model, and thereby improve the relevance of the AI-enabled chatbot's responses in the future.

Other key features and aspects of the generative AI-enabled chatbot in FIG. 2 are possible as well. For example, a GAI-enabled chatbot can provide comprehensive insights into the workflow platform, answering questions on policies, procedures, and transactions. Optionally, the system 100 can include one or more additional modules to enhance the operation and provide further advantages. For example, a Summarization and Real-Time Analysis module can summarize key transaction points and offer real-time cognitive analysis to assist users in decision-making. A Query Response module can deliver detailed responses to queries about any workflow transactions, improving transparency and understanding of the system-level issues. An Efficiency Enhancement module can optimize the workflow approval process, reducing human error and increasing overall efficiency. A Historical Data Insights module can offer insights into historical transactions to aid in better decision-making. GAI integration can incorporate generative AI capabilities specifically tailored for workflow applications, enhancing information gathering and data correlation. A Dynamic Onboarding module can support dynamic onboarding of the chatbot for each workflow through configurations during workflow onboarding.

Figure 3:
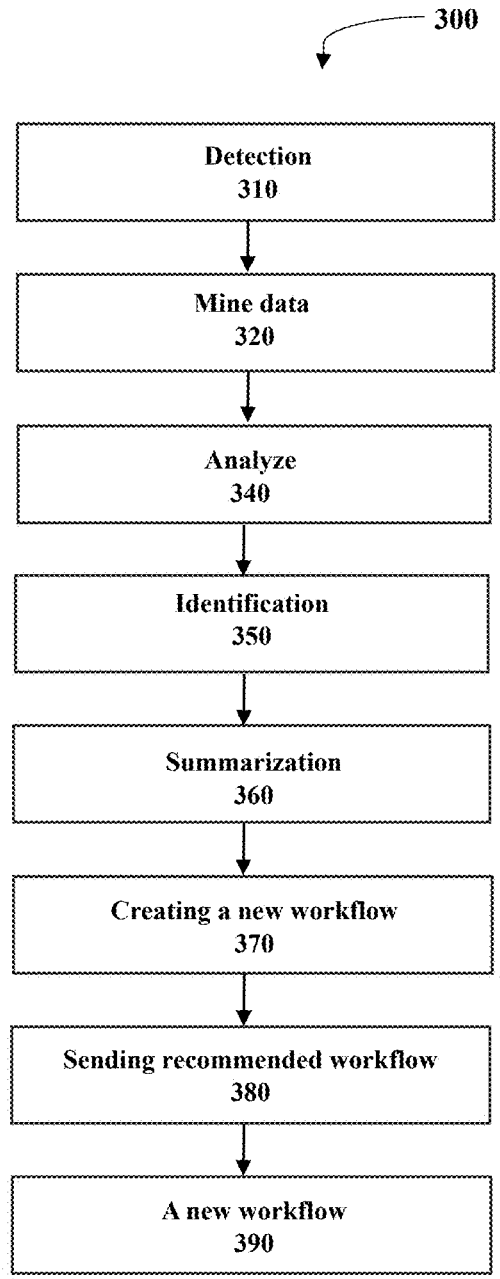
FIG. 3 illustrates, in a simplified form, one example of a workflow diagram of AI-based Offline Workflow recommendation system for workflow identification and optimization according to the teachings herein.

FIG. 3 illustrates, in simplified form, an example flowchart 300 for another example implementation showing how the system 100 operates on the workflow information based upon the use of the Chatbot UI 120 where the process generates a new workflow as a result. First, the system 100 may detect (Step 310) which workflow steps have taken considerably more time than desired. Prompt engineering can then be used to mine stored data (Step 320) and fetch potential workflow details and patterns for the remediation. The system 100 can then analyze (Step 340) the workflow-related details such as from elements, attached documents, notes/audit, and so forth. The system 100 then identifies patterns (Step 350) taken from previous manual remediation steps. If a summarization (Step 360) capability is present, the system 100 can provide a summary from the AI model using a completions API. The system 100 can then create (Step 360) a new workflow definition using an onboarding file, for example, as a JSON file, such as described in connection with FIGS. 6A-6C. The system 100 will then output (Step 380) a recommended workflow onboarding. Upon approval, the new workflow will become available (Step 390) in either a blue or a green cell.

The AI model can then utilize similarity functions to narrow the relevant records and summarize the filtered dataset using completion functions. The AI model can extract the common actions that were taken across previous situations where users found a viable workaround. The identification of new patterns of actions (i.e., checking a specific system to validate data, including additional approval/rejection steps from users/roles, inspecting notes from historical records, and so forth) can then be summarized as new workflow stages. For example, a new workflow stages can retrieve documents that are pertinent to the workflow (from workflow definition stored in workflow designer databases) and store into a vector index. The new workflow stages can retrieve workflow transactional details from notes/audit, containing info around long running tasks, any manual interventions and the correlated supplemental data points. A new functional chain strategy pattern may be generated in the system 100 based on the identification of new patterns of actions. The new functional chain strategy pattern can select appropriate AI interactions, APIs, data source selections, completions, embeddings, and source selectors.

The new stages are systemically identified and can be used to create a new workflow definition to track and execute business processes (deployed in either blue or green cells such as described in commonly owned, U.S. Pat. Nos. 11,595,495 and 11,914,992). The AI models can provide the recommendations in the form of a new workflow definition file.

Figure 4:
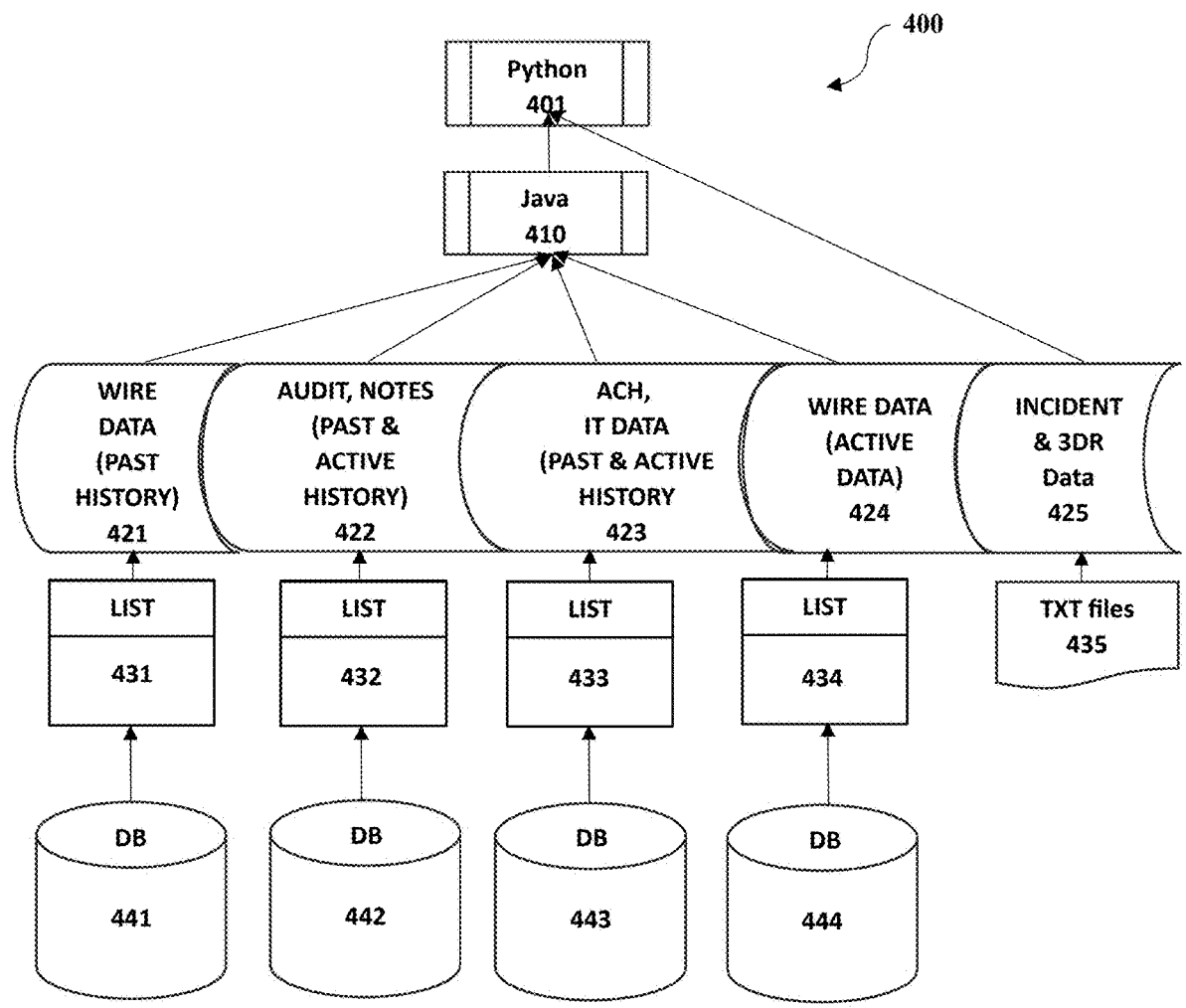
FIG. 4 illustrates, in a simplified form, one example of Data Sources architectures according to the teachings herein.

FIG. 4 illustrates, in a simplified form, one example of an architecture for the Data Sources in the system 100. The diagram shows how raw data is collected from each Data Source and transferred to feed OpenAI in the system 100. The OpenAI is external to the system, but can be swapped with any LLM. Yes, data is sent to the LLM. The LLM location is not pertinent, it is currently referencing externally hosted LLMs, but can also reference internally hosted LLM in the future. The Data Source architecture 400 is, as shown, logically a tree structure of database servers and the sample data is collected from lower nodes and transferred to upper nodes in the database servers. The collected data feeds the OpenAI, which is written in, for example, Python 401. The Data Source from each database server is transferred though the tree structure to the upper node to form an organized group list. For example, one group list 431 includes payment ID, transaction data attributes, and account data attributes. Another group list 432 contains payment ID, Notes Data, and Audit Data. A further group list 433 includes payment ID, Group ID, Account Data Attribute, and Transaction Data Attributes. An additional group list 434 includes instance Data. A node 435 includes text files as a Data Source. A wire data server 421 collects the payment ID, transaction data attributes, and account data attributes information from the group list 431 based on the past recorded database history. The audit and notes server 422 collects the payment ID, Notes Data, and Audit Data information from the group list 432 based on the past and current active recorded database history. The Automated Clearing House (ACH) and IT data server 423 collects the payment ID, Group ID, Account Data Attribute, and Transaction Data Attributes information from the group list 433 based on the past and current active recorded database history. A wire data server 424 collects a STET from the group list 434. The incident and a knowledgebase articles for Policies and Procedure documents (3DR) server. A knowledgebase articles for Policies and Procedure documents (3DR) collects the text files information from the node 435. The program written in Java 410 runs to extract all the server information to provide them to the OpenAI 401. The Microservice may invoke various APIs to retrieve the relevant data needed for providing context to the system. For example, the information from the wire data server 421, the information from the audit and notes server 422, the information from the wire data server 424 are all collected and integrated by the program. New APIs are access points for new data sources that can be leveraged for obtaining information. The information of the ACH and IT data is collected and integrated by the program using the relevant APIs. The relevant APIs are identified by the function classification component and the java program may invoke and retrieve all the data needed for passing to the completions model. The collected data, including the text files, is feeding to OpenAI 401.

Figure 5:
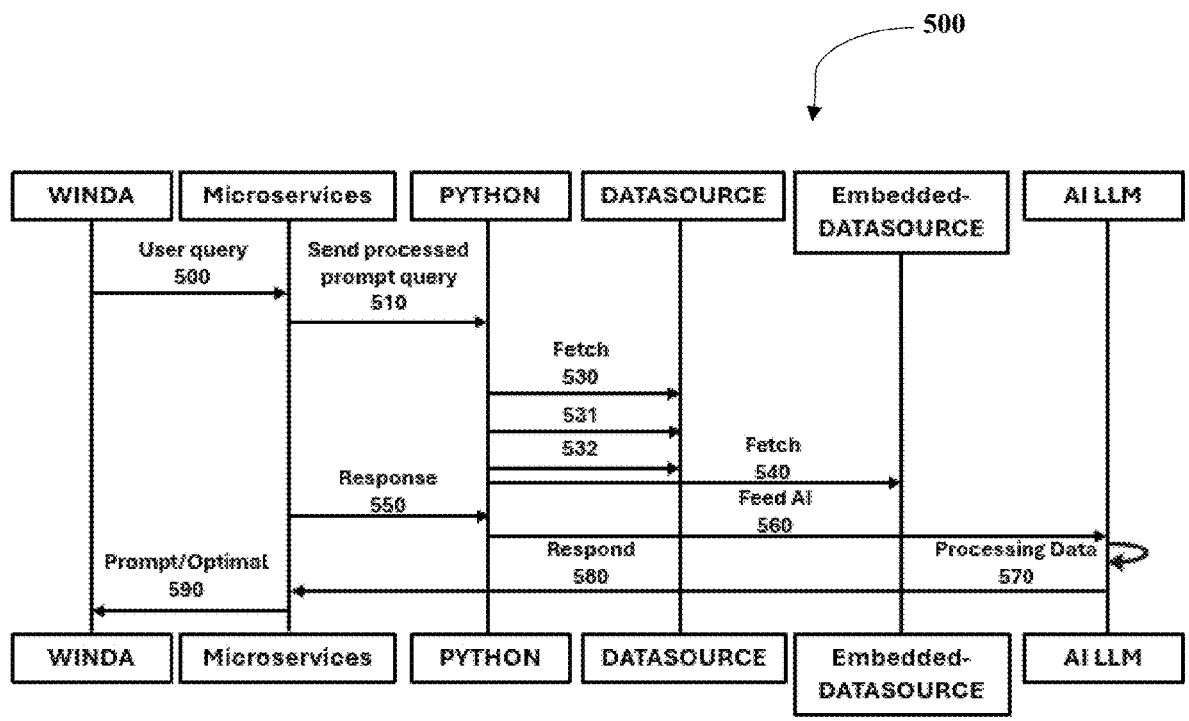
FIG. 5 illustrates, in a simplified form, one example of a workflow identification and optimization sequence according to the teachings herein.

FIG. 5 illustrates, in a simplified form, a detailed sequence diagram 500 for the operation of the system 100 based upon a user query via the Chatbot UI 120. As shown, the process begins when a WINDA module sends a user query (a Request for Information (RFI)) (Step 500) to a Microservices. The Microservices receives the query and sends (Step 510) processed prompt query. Python layer may supply the context of the workflow as well as the conversation history from the current user session, decide which APIs are needed to satisfy the question from the user, determine the API parameters that need to be passed from the transaction context, retrieve all relevant data from 1 or more data sources. It may accomplish this by evaluating the data inputs (composed of the original workflow elements, the workflow type, the notes/audit details of all related transactions, user/chatbot conversation interactions, and embeddings from other data sources). Notes/comments may be used to identify what actions were taken outside of the workflow process definition (get timings, actions, manual inferences, swivel chair details of systems, etc.).

A program module receives the processed prompt query and the relevant APIs that are needed to gather data for the user request, and the identified APIs are invoked to retrieve data from relevant source system. APIs provide consolidated Transactional Data (which allows users to keep their database manageable by creating summary records from the detail records and then deleting the detail records from their database) to the Microservices. The Microservices receives the API's and consolidates the transactional data. The system 100 then, fetches (Step 530) transaction history from Python layer and sends it to Data Source module. The system next, fetches (Step 531) an audit history from Python layer and sends it to the Data Source module. The system 100 then, fetches (Step 532) payment history from the Python and sends it to the Data Source module. The system fetches (Step 540) incident and knowledgebase of policies/procedure related articles (3DR) embedding from the Python program and sends it to an embedded-Data Source. The Microservices sends a consolidated response (Step 550) to ingest to the Python component. The python layer may consolidate the RAG dataset and send the response back to the process that invoked the request. The LLM may take the datasets and conversation history to summarize and produce a response for the user. The output and summary of appropriate datasets may be determined by relevant prompts provided to the LLM. Data Source feeds (Step 560) AI LLM. The AI LLM process data and construct (Step 570) response from the program (Python). The AI LLM responds (Step 580) with generative response to the python layer (need to update the sequence diagram (current drawing skips python). The Microservices receives a response from the AI LLM and sends the prompt/optimal response (Step 590) to the WINDA module.

Below are examples scenarios that illustrate how the invention can offer benefits for the chatbot flows and the offline optimization/recommendation flows.

In Scenario Illustration 1, the user is presented with a few predefined questions in the chatbot, such as "Show me any overdue items" or "Show my high-priority items for today." When the user logs into the workflow through the user interface (dashboard/chatbot), the bot automatically detects the user's context and uses it as a filter to retrieve relevant user transactions.

The chatbot then passes the user's question and associated profile information to a microservice built in Java. This microservice processes the query based on the authenticated user interacting with the chatbot.

The AI wrapper, developed in Python, initiates an orchestration chain to store the sequence of steps needed for data collection and for retrieving responses from the large language model (LLM). It classifies the function and parameters, then calls transaction details. Using the context established by the chatbot (which is passed to the microservice layer), the AI wrapper collects API descriptions, the user query, and generates a customized prompt instructing the LLM to identify the necessary APIs. Inputs include the conversation history, user ID, workflow type (e.g., Wire Outgoing Approval Flows), and relevant source system links. Based on these inputs, the system identifies relevant APIs that need to be invoked, including getUserProfile from the enterprise entitlement system, get_all_workflows_data (restricted by user entitlements), get_incident_report_data_from_pager_duty (for support personas), and get_past_and_current_user_or_system_action_information.

Data retrieval occurs through API invocation, where each API is added to the orchestration chain. The AI prompts then handle parameter classification, incorporating the conversation history to determine the parameters required for each API. For instance, it may invoke get_incident_report_data from the incident management system. The inputs to the LLM include the conversation history and the current date and time for identifying today's issues.

The LLM wrapper, also developed in Python, summarizes the transaction and incident data to emphasize impact. It uses AI prompts that consider the conversation history, relevant data, and instructions on how to summarize key attributes important to the user. Finally, the system returns the summarized data back to the user, highlighting the requested information.

In Scenario Illustration 2, the user enters a question into the chatbot while viewing a specific transaction or workflow task, such as "Why is the transaction in pending status?" The user interacts with the workflow dashboard, selecting specific workflows to review and take actions. The chatbot automatically detects the context of the selected workflow task and uses it as the basis to drill down into the relevant transaction.

The chatbot passes the user's question, along with the details of the workflow transaction currently being viewed on the dashboard, to a microservice. The user profile information associated with the authenticated user is also passed along to the microservice to process the request.

An AI wrapper, built in Python, initializes an orchestration chain that stores the sequence of steps for collecting data and retrieving responses from the large language model (LLM). The AI wrapper performs function and parameter classification, calling services such as the workflow definition service and the transaction detail service. Using the context provided by the chatbot, which is passed to the microservice layer, the AI wrapper gathers API descriptions, the user's query, and generates a customized prompt instructing the LLM to select the relevant APIs. Inputs include conversation history, user ID, workflow type (e.g., Wire Outgoing Approval Flows), and relevant source system links for user reference.

Based on these inputs, the system identifies the necessary APIs to retrieve data, such as getUserProfile from the enterprise entitlement system, get_all_workflows_data (restricted by user access and group ID), and get_incident_report_data_from_pager_duty for support personnel or problem-related questions. If there is any ongoing incident related to the specific transaction or system being queried, the incident details are returned to the user. The system also retrieves get_past_and_current_user_or_system_action_information for comprehensive information.

Data retrieval occurs via API invocation, with each API added to the orchestration chain. AI prompts are used to handle parameter classification and incorporate conversation history, ensuring the correct parameters are applied to each API. For instance, get_incident_report_data is retrieved from the incident management system. The inputs to the LLM include conversation history and the current date for identifying any issues that may be relevant to the transaction.

The LLM wrapper summarizes the transaction and incident data, highlighting the most impactful information. AI prompts take into account conversation history, relevant data, and specific instructions to focus on attributes that are important to the user. Finally, the summarized data is returned to the user, answering their question and providing relevant information about the transaction.

In Scenario Illustration 3, the offline workflow recommendation and optimization process is initiated by a scheduler trigger. A scheduler, such as (but not limited to) Cron, Tvioli or Java, sends an API invocation to a microservice to start the offline workflow recommendation process. The workflow names or types can be parameterized to target specific workflows that require recommendations or optimizations, and the scheduler job passes the workflow type parameter to the microservice.

The microservice, developed in Java, forwards the workflow types that need analysis to the Python component. The AI wrapper, implemented in Python, initializes an orchestration chain that stores the sequence of steps for data collection and retrieval of responses from the large language model (LLM). It gathers historical and archived data, audit logs, notes, and retrieves workflow details such as get_all_workflows_data, which includes audit records, notes, and historical details for the workflow types over a given duration. Additionally, the system collects get_past_and_current_user_or_system_action_information.

Data retrieval is carried out by invoking the relevant APIs, which are added to the orchestration chain. AI prompts handle parameter classification by incorporating conversation history to determine which parameters should be used for each API call. The system also retrieves incident data from the incident management system and feeds inputs such as SLA breaches, durations, the number of user inquiries, workflow transaction details, audit logs, and notes into the LLM.

The LLM wrapper analyzes the inputs and generates recommendations for workflow optimization. The AI prompt focuses on identifying inefficiencies and areas for improvement. For example, the system checks whether certain tasks prone to SLA breaches need to be re-adjusted, escalated to the appropriate owners, or auto-closed with notes and email notifications to relevant users. It also assesses whether users are interacting via email, phone, or direct messaging, and captures these interactions in a notes database. If work is being done outside the workflow, such as in other systems, the system can propose a new action for integration. From incident report data, the system may suggest automated periodic retries for intermittent or problematic source systems. It also identifies potential parallel flows to reduce overall processing time.

The system adds prompts in JSON format, summarizing transaction and incident data for impact. AI prompts take into account conversation history, relevant data, and instructions on how to summarize key attributes important to the user. Finally, the recommendations or updated workflow definitions are returned to the product owner for review.

A WINDA analyzer is a component that can expose various Representational State Transfer (REST) based APIs to support data analysis and recommendation functions. These may include a service façade, which may be a Python based, to provide access to the handling of data embeddings, AI wrappers to support function classifiers, data aggregation from various sources (i.e., embeddings, vector index, and function output), and prompt customization to structure any expected output.

As addressed above, prompt engineering can be used mine the data and fetch the potential workflow details and patterns of remediation. The WINDA Analyzer can utilize prompts to analyze the data, identify relevant functions and use completion APIs to structure the output in an onboarding JSON format (alternatively, the structure can be represented in YAML or AVRO formats). A sample computer program for onboarding is collectively shown in FIGS. 6A-6C. An analysis related prompt can be used to specify how to inspect the workflow process definition files, along with the transactional notes/audit for that day. The prompt can use those datasets to identify where manual actions (i.e., email, swivel chair, phone calls, and so forth) were taken outside of the original workflow definition. A recommendation related Prompt can be used to convert the identified changes and structure into the expected format for the Workflow designer.

An output of the WINDA Analyzer would be a JSON representation of key workflow steps/status that captures required actions from start to the end of the business flow. The recommended stages can represent either human or systematic optimizations (i.e., auto approve, system interactions, threshold rules, and so forth), by adding to the existing workflow process definition or by creating an entirely new workflow process.

The output of the WINDA Analyzer can then be used to onboard a new workflow using a workflow builder utility. The workflow can be onboarded in a draft state (by invoking Designer APIs), and send a notification to a relevant user, who can review and approve the recommended changes provided by the WINDA Analyzer. Upon approval, the workflow may be activated across the workflow platform, leveraging blue/green infrastructure.

One example variant of our system, a Workflow Information Retrieval module can utilize GAI techniques to summarize and retrieve pertinent information from the workflow system. An Auto-Approval Mechanism can automatically approve workflows based on user or system-level thresholds. A Data Entitlements Control can ensure controlled data responses based on user entitlements. An Integration of Multiple Data Sources can integrate various data sources, including historical data, audit notes, and real-time data through APIs. A Prompt Control and Customization can customize prompts based on workflow domains, user roles, and other dimensions. An AI-Based Summary and Completion can use AI completion APIs to summarize key artifacts and optimize data retrieval using embeddings. A FAQ Caching and Ranking can cache frequently asked questions and ranks them based on past user interactions to provide relevant and quick responses. A Feedback Mechanism at the step in FIG. 2 can implement a supervised feedback loop for tuning prompts and FAQs, ensuring continuous improvement.

With some variants implementing the teachings herein, the "Ask Me Anything" chatbot can provide a centralized, AI-driven platform for workflow management and approval. Quick access to key policies and procedures along with summarized impacts may provide a direct time savings for financial advisors. With other variants, the "Ask Me Anything" chatbot can reduce the time and effort required for users to review and approve workflows. With still other variants the "Ask Me Anything" chatbot can offer transparency into system-level issues impacting specific transactions. Further variants of the "Ask Me Anything" chatbot can enable efficient correlation of data points relevant to workflow approval processes. Additional variants of the "Ask Me Anything" chatbot can reduce training incidents by providing centralized and accessible information.

The Workflow Insights and Data Assistant can be commercially applied as an add-on to existing workflow management systems, making it suitable for various industries and domains. Its configuration-driven nature allows it to be adapted to different workflow products available in the market. Advantageously, the dynamic UI builder and preview capabilities can also be applied to any form-based web application, enhancing its commercial viability.

FIGS. 6A-6C illustrate, in simplified form, one example of sample JSON code that is usable for workflow onboarding in connection with the various features and processes described herein.

For example, OpenAI can summarize a workflow, while personalizing the response to the specific question and user persona, making it easy to understand for every user. OpenAI can analyze large amounts of data quickly and accurately, providing valuable insights that can inform business decisions. OpenAI can help reduce the inefficiencies and allow branch users to spend time building client relationships. Generating FAQ can be done with the system. For example, the system can generate top FAQ from all questions asked by our user's basis of their profile. OpenAI can identify, and short list generalized, for example, top 3 questions (not limited) which can save time asking queries when clicking on pre-defined FAQ. Reduced Incidents can be done with the system. OpenAI can efficiently match to the closest open incidents for a given problem which can increase efficiency of production support as they can focus more on Root Cause Analysis (RCA) and analyzing existing incidents than creating new ones. If there is no matching incident in the Incident management system (IMS), the Python module may create a new incident ticket by invoking the relevant APIs from IMS, any ticket information may be shared back to the user for reference and tracking purposes. The end users may not create new incidents if they know the root cause of an issue.

There are challenges that users encounter that cause delays in business transactions from completing within an expected Service Level Agreement (SLA). The workarounds from these challenges can be related to various factors such as human processing errors, time taken to summarize transaction data for identifying next steps, time taken to identify and correlate relevant datapoints from other systems (i.e., incident management systems, reference data systems, knowledgebases for articles, etc.), and need to swivel chair into multiple systems and documentations for approvals. Through according of the teachings herein, these challenges (amongst others) can be streamlined and simplified to enable faster resolution times and increase customer satisfaction.

An example implementation implementing the teachings herein aims to use the AI models to systematically detect improvement opportunities (by analyzing historical workflow transactions) and proposing a new workflow definition that can be used for potential new business process flows and the inherent efficiency gains. By utilizing the details of previous workflows, the system can detect which workflow steps/stages took a considerably longer time for users to complete and analyze what actions (by inspecting the notes and audit details) that users took to move the workflow forward. The common resolution actions taken across the historical dataset can be used to highlight a pattern of activity that can be systematically encapsulated as a new workflow definition.

WINDA can find workflows that can be further optimized by taking the average time taken for each step and highlight the most time taken steps and workflows. For example, a WINDA Aggregator, operated with a Python-based component (alternatively the implementation can be done in Scala or Java languages), can be used to gather data and slice/dice the relevant data points for evaluation, by using Structured Query Language (SQL) queries and storing the output in, for example, Pandas data frames. The WINDA Aggregator can also have services exposed that can aggregate data, classify functions (based on the data and available restful APIs), and interact with the LLM using LangChain 190 to connect the inputs, outputs, and summarizations.

Based upon the foregoing, it should now be appreciated that implementations of the teachings described herein can provide numerous advantages with respect to workflow management. In this regard, it is to be understood that the foregoing outlines, generally, the features and technical advantages of one or more implementations that can be constructed based upon the teachings in this disclosure in light of the detailed description and figures. However, the advantages and features described herein are only a few of the many advantages and features available from representative examples of possible variant implementations and are presented only to assist in understanding. It should be understood that they are not to be considered limitations on any invention defined by the appended claims, or limitations on equivalents to the claims. For instance, some of the advantages or aspects of different variants are mutually contradictory, in that they cannot be simultaneously present in a single embodiment. Similarly, some features or advantages may be applicable to one aspect and inapplicable to others. Thus, the foregoing features and advantages should not be considered dispositive in determining equivalence. Additional features and advantages may also be apparent from the teachings of the description, drawings, and claims and are not intended to be excluded by their absence above.

The main benefits of this implementation can ultimately help to reduce the time that users spend when reviewing/approving workflows when unexpected issues arise, and provides necessary guidance/structure to optimally carry out their day-to-day tasks. These productivity related questions can be a pre-defined question (shown to the user) and answered by the bot. An example of a question would be "What was my average task completions in the previous month/week/day and how am I doing this month." It can provide real-time cognitive analysis, increased efficiency in the workflow approval process, and utilize insights from historical transactions to generate new workflow process definitions.

Another benefit is that an on-demand chat interface is integrated into the workflow platform. A system may retrieve workflow specific policy/procedure instructions instantly from a knowledgebase of policies/procedure related articles (3DR). The system may answer specific workflow details and generic workflow related queries from branch users. The system may find impact and summarize the issue for stakeholders including problem, remediation, and impacts. The system may identify impacted systems, business functions and channels.

Figure 7:
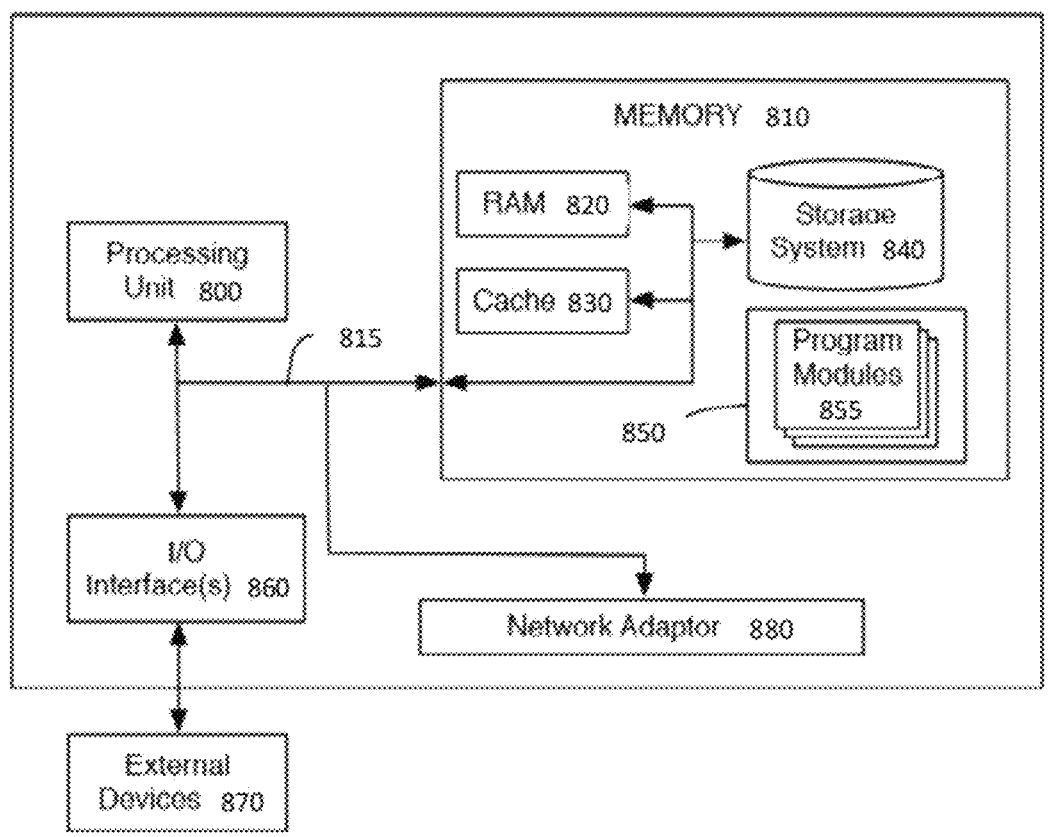
FIG. 7 is a high-level block diagram of a representative computing device that may be utilized to implement various features and processes described herein.

For the purpose of illustrating possible such computing devices, FIG. 7 describes various enabling devices and technologies related to the physical components and architectures described above. The computing device is illustrated in the form of a special purpose computer system. The components of the computing device may include (but are not limited to) one or more processors or processing units 800, a system memory 810, and a bus 815 that couples various system components including the memory 810 to the processor 800.

The bus 815 represents one or more of any of several types of bus structures, including a memory bus or memory controller, a peripheral bus, an accelerated graphics port, and a processor or local bus using any of a variety of bus architectures.

Processing unit(s) 800 may execute computer programs stored in memory 810. The computing device typically includes a variety of computer system readable media. Such media may be any available media that is accessible by the computing device, and it includes both volatile and non-volatile media, removable and non-removable media.

The system memory 810 can include computer system readable media in the form of volatile memory, such as the random-access memory (RAM) 820 and/or cache memory 830. The computing device may further include other removable/non-removable, volatile/non-volatile computer system storage media. By way of example only, storage system 840 can be provided for reading from and writing to a non-removable, non-volatile magnetic media (not shown and typically referred to as a "hard drive"). In such instances, each can be connected to bus 815 by one or more data media interfaces. As will be further depicted and described below, memory 810 may include at least one program product having a set (e.g., at least one) of program modules that are configured to carry out the functions of embodiments described in this disclosure.

The program/utility 850, having a set (at least one) of the program modules 855, may be stored in the memory 810 by way of example, and not limitation, as well as an operating system, one or more application software, other program modules, and program data. Each of the operating system, one or more application programs, other program modules, and program data or some combination thereof, may include an implementation of a networking environment.

The computing device may also communicate with one or more external devices 870 such as a keyboard, a pointing device, a display, etc.; one or more devices that enable a user to interact with the computing device; and/or any devices (e.g., network card, modem, etc.) that enable the computing device to communicate with one or more other computing devices. Such communication can occur via Input/Output (I/O) interface(s) 860.

In addition, as described above, the computing device can communicate with one or more networks, such as a local area network (LAN), a general wide area network (WAN) and/or a public network (e.g., the Internet) via network adaptor 880. As depicted, network adaptor 880 communicates with other components of the computing device via bus 815. It should be understood that although not shown, other hardware and/or software components could be used in conjunction with the computing device.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It is understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computerized system for improving business process workflow using at least one software service, comprising:
    a workflow platform including multiple business processes and user roles;
    an online component including
        an AI-enabled chatbot integrated with the workflow platform and configured to receive queries from users, the chatbot using generative AI (GAI) techniques to provide information on policies, procedures, and workflow transactions;
        wherein the online component will retrieve and aggregate data from multiple sources, including real-time APIs and static documents;
        a user interface configured to allow a user to submit a specific query and, in response, display summarized information and recommendations generated by the AI-enabled chatbot in response to the specific query, wherein the AI-enabled chatbot automatically approves workflows based on thresholds;
    an offline component including
        a scheduler that initiates a workflow recommendation and optimization process;
        an AI wrapper, initiated by the scheduler, that collects workflow-related data from at least one data source and feeds the workflow-related data into a large language model wrapper; and
        wherein the large language model wrapper analyzes the workflow-related data received from the AI wrapper and generates one or more workflow recommendations or optimizations for the at least one of the multiple business processes.

2. The system of claim 1, wherein the system is further configured to perform an entitlement check on a user prior to displaying the summarized information and the recommendations.

3. The system of claim 1, wherein the integrated AI-enabled chatbot supports entitlements-controlled data responses to ensure data security and compliance.

4. The system of claim 1, further comprising a workflow risk calculator that leverages the AI-enabled chatbot to calculate on demand risk score and justify risk analysis on a workflow.

5. The system of claim 1, wherein the AI-enabled chatbot optimizes data retrieval and accuracy.

6. The system of claim 1, further comprising a feedback mechanism that includes a supervised feedback loop and frequently asked questions (FAQs) while the AI-enabled chatbot interacts with users.

7. The system of claim 6, wherein the FAQs are cached and relevancy ranked based on positive past user interactions.

8. The system of claim 1, wherein the AI-enabled chatbot generates a functional chain strategy pattern that selects appropriate AI interactions, APIs, data source selections, completions, embeddings, and source selectors.

9. The system of claim 1, wherein the AI-enabled chatbot is configured to dynamically onboard workflow using one or more configurations.

10. A computer-implemented method for improving business process workflow using at least one software service, comprising:
- an online process including
  - analyzing a workflow having at least one business process and user role;
  - receiving a query from a user at an AI-enabled chatbot;
  - retrieving and aggregating data, from multiple sources, using a data integration module;
  - generating a response, based upon the user query, wherein the response includes at least one or more procedures, policies, recommendations or workflow transactions;
  - displaying summarized information and recommendations generated by the AI-enabled chatbot based on the user query, wherein the AI-enabled chatbot automatically approves workflows based on user defined thresholds;
- an offline process including
  - in accordance with a specified schedule, retrieving workflow related data from at least one data source;
  - feeding the workflow-related data from the at least one data source into a large language model wrapper;
  - analyzing the retrieved workflow related data using the large language model wrapper to identify workflow inefficiencies or areas for improvement;
  - generating one or more workflow recommendations or optimizations for the at least one business process; and
  - implementing the one or more generated workflow recommendations or optimizations.

11. The method of claim 10, further comprising summarizing grouped transactions and detecting high-risk transaction using the AI-enabled chatbot.

12. The method of claim 10, further comprising displaying the summarized information.

13. The method of claim 10, further comprising automatically filtering the query from the user to the AI-enabled chatbot based on the user role.

14. The method of claim 10, wherein the integrated AI-enabled chatbot supports entitlements-controlled data responses to ensure data security and compliance.

15. The method of claim 10, further comprising calculating an on-demand risk score using a workflow risk calculator that leverages the AI-enabled chatbot.

16. The method of claim 10, further comprising optimizing data retrieval and accuracy using the AI-enabled chatbot.

17. The method of claim 10, further comprising generating a functional chain strategy pattern using the AI-enabled chatbot, wherein the functional chain strategy pattern selects one or more of AI interactions, APIs, data source selections, completions, embeddings, and source selectors.

18. The method of claim 10, further comprising dynamically onboarding workflow using one or more configurations via the AI-enabled chatbot.

* * * * *